US012783187B2

(12) United States Patent
Shiraga

(10) Patent No.: US 12,783,187 B2
(45) Date of Patent: Nov. 3, 2026

(54) PRINTER, NON-TRANSITORY COMPUTER-READABLE RECORDING MEDIUM STORING COMPUTER-READABLE INSTRUCTIONS FOR PRINTER, AND METHOD EXECUTED BY PRINTER

(71) Applicant: BROTHER KOGYO KABUSHIKI KAISHA, Nagoya (JP)

(72) Inventor: Naoto Shiraga, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 209 days.

(21) Appl. No.: 18/624,701

(22) Filed: Apr. 2, 2024

(65) Prior Publication Data

US 2024/0329895 A1 Oct. 3, 2024

(30) Foreign Application Priority Data

Apr. 3, 2023 (JP) ................................ 2023-060411
Jan. 12, 2024 (JP) ................................ 2024-003583
Jan. 30, 2024 (JP) ................................ 2024-011642

(51) Int. Cl.
*G06F 3/12* (2006.01)

(52) U.S. Cl.
CPC .......... *G06F 3/1228* (2013.01); *G06F 3/1203* (2013.01); *G06F 3/1231* (2013.01)

(58) Field of Classification Search
CPC ..... G06F 3/1228; G06F 3/1203; G06F 3/1231
USPC ........................................................ 358/1.15
See application file for complete search history.

(56) References Cited

U.S. PATENT DOCUMENTS

2007/0162480 A1* 7/2007 Garg .................. G03G 15/5079
2008/0278754 A1 11/2008 Hibino
2017/0161719 A1* 6/2017 Bhatia .................. G06Q 20/327
2020/0174718 A1 6/2020 Yamada
2022/0179603 A1 6/2022 Sako et al.
2023/0367530 A1 11/2023 Sako et al.
2024/0329896 A1 10/2024 Shiraga

FOREIGN PATENT DOCUMENTS

JP 2004126789 A 4/2004
JP 2008283438 A 11/2008
JP 2016-136327 A 7/2016
JP 2020-087255 A 6/2020
JP 2021-140219 A 9/2021
JP 2022-089143 A 6/2022

* cited by examiner

*Primary Examiner* — Charlotte M Baker
(74) *Attorney, Agent, or Firm* — Kenealy Vaidya LLP

(57) ABSTRACT

A printer disclosed herein may comprise: a print execution device; and a controller, wherein the controller is configured to: in a case where a print execution instruction is received from a terminal device, cause the print execution device to execute printing of an image according to the print execution instruction; and in a case where the print execution instruction is received from the terminal device and the print execution instruction is generated by a general-purpose driver not provided by a vendor of the printer, cause an output device of the printer to output service information related to a subscription to a service related to the printer.

12 Claims, 7 Drawing Sheets

(Case A)

(Continuation of FIG. 3)

(Case B)

Same as T70 to T82 of FIG. 3 and T90 to T142 of FIG. 4

(Case C)

Same as T70 to T82 of FIG. 3 and T90 to T142 of FIG. 4

PRINTER, NON-TRANSITORY COMPUTER-READABLE RECORDING MEDIUM STORING COMPUTER-READABLE INSTRUCTIONS FOR PRINTER, AND METHOD EXECUTED BY PRINTER

REFERENCE TO RELATED APPLICATIONS

This application claims priority from Japanese Patent Application No. 2023-060411 filed on Apr. 3, 2023, Japanese Patent Application No. 2024-003583 filed on Jan. 12, 2024, and Japanese Patent Application No. 2024-011642 filed on Jan. 30, 2024. The entire contents of the priority applications are incorporated herein by reference.

BACKGROUND ART

A printer that can print by both a standard driver used for any model and a vendor-specific driver provided by a vendor of the printer is known.

SUMMARY

The present disclosure provides a technique that can properly notify a user of information related to a subscription to a service related to a printer.

A printer disclosed herein may comprise: a print execution device; and a controller, wherein the controller is configured to: in a case where a print execution instruction is received from a terminal device, cause the print execution device to execute printing of an image according to the print execution instruction; and in a case where the print execution instruction is received from the terminal device and the print execution instruction is generated by a general-purpose driver not provided by a vendor of the printer, cause an output device of the printer to output service information related to a subscription to a service related to the printer.

The above printer causes the output device to output the service information related to the subscription to the service related to the printer in the case where the print execution instruction is generated by the general-purpose driver. Consequently, a user who uses the general-purpose driver to cause the printer to execute printing can suitably be notified of the service information.

A computer program for realizing the above printer and a computer-readable recording medium storing the above computer program are also novel and useful. A method executed by the above printer is also novel and useful.

DESCRIPTION

Figure 1:
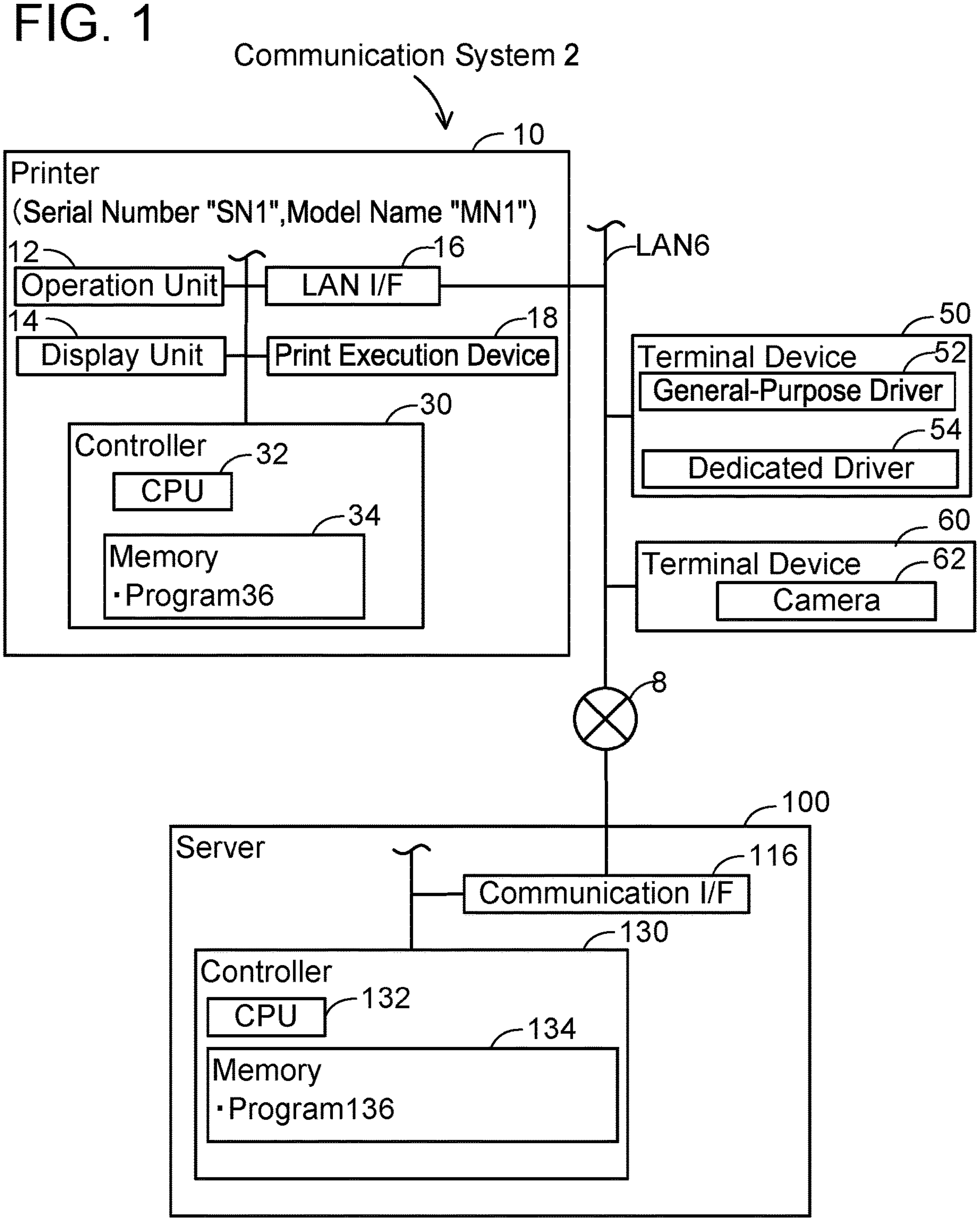
FIG. 1 illustrates a configuration of a communication system.

First Embodiment (Configuration of Communication System 2; FIG. 1)

As illustrated in FIG. 1, a communication system 2 includes a printer 10, a terminal device 50, a mobile device 60, and a server 100. The devices 10, 50, 60 are connected to a LAN 6 and configured to communicate with each other via the LAN 6. The LAN 6 may be a wired LAN or a wireless LAN. The devices 10, 50, 60 are configured to communicate with the server 100 mutually via the Internet 8.

(Configuration of Printer 10)

The printer 10 is a peripheral device configured to execute a printing function (e.g., a peripheral device of the terminal device 50). In a modification, the printer 10 may be a multifunctional machine configured to execute a scanning function, a facsimile function, etc., in addition to a printing function. The printer 10 includes an operation unit 12, a display unit 14, a LAN interface 16, a print execution device 18, and a controller 30. The units 12-30 are connected to bus lines (refence sign omitted). In the following, the interface is simply described as "I/F".

The operation unit 12 includes a plurality of keys. The user can input various instructions to the printer 10 by operating the operation unit 12. The display unit 14 is a display that displays various information. The display unit 14 also functions as a so-called touch screen (i.e., an operation unit which accepts user operation). The LAN I/F 16 is connected to the LAN 6. The print execution device 18 includes a printing mechanism of an inkjet scheme. The printing mechanism may be referred to as a "print engine". In a modification, the print execution device 18 may include a printing mechanism of a scheme different from the inkjet scheme, for example, a laser scheme or a thermal scheme.

The controller 30 includes a CPU 32 and a memory 34. The CPU 32 executes various processes according to a program 36 stored in the memory 34. The memory 34 is configured of a volatile memory, a nonvolatile memory, and the like.

A model name of the printer 10 is MN1 and a serial number SN1 is assigned to the printer 10. The memory 34 stores the model name MN1 and the serial number SN1.

(Configuration of Server 100)

The server 100 is a server that provides a service related to a printer. The service is, for example, a subscription service that allows printing up to the contractual number of sheets set in each predetermined period (e.g., one month) at a fixed rate. If the number of sheets printed in the predetermined period exceeds the contractual number of sheets, the user pays an additional fee (e.g., a fee obtained by multiplying a difference between the number of sheets printed and the contractual number of sheets by a unit price). The contractual number of sheets may vary depending on contracted plans.

The server 100 includes a communication I/F 116 and a controller 130. The units 116, 130 are connected to bus lines (reference sign omitted). The communication I/F 116 is connected to the Internet 8.

The controller 130 includes a CPU 132 and a memory 134. The CPU 132 executes various processes according to a program 136 stored in the memory 134. The memory 134 is configured of a volatile memory, a nonvolatile memory, and the like.

(Configuration of Terminal Device 50 and Mobile Device 60)

The terminal device 50 is a user terminal such as a desktop PC, laptop PC, tablet PC, or cell phone (e.g., smartphone). The terminal device 50 includes a general-purpose driver 52. The general-purpose driver 52 is software for converting target data representing an image to be printed and generating print data having a data format that can be interpreted by the printer 10.

The general-purpose driver 52 is a printer driver provided by a provider different from the vendor of the printer 10. The general-purpose driver 52 can cause various printers manufactured by different printer vendors to execute printing. In this embodiment, the general-purpose driver 52 is a driver that causes a printer to execute printing according to the Internet Printing Protocol (IPP) scheme, for example, AirPrint or Mopria. AirPrint is a registered trademark of Apple Inc. Mopria is a registered trademark of Mopria Alliance Incorporated. In a modification, the general-purpose driver 52 may be a driver that causes a printer to execute printing according to a scheme different from the IPP scheme.

The terminal device 50 can install a dedicated driver 54. The dedicated driver 54 is a printer driver provided by the vendor of the printer 10 and, as with the general-purpose driver 52, the dedicated driver 54 is software for generating print data. The dedicated driver 54 is a dedicated printer driver for the printer having the model name MN1. In particular, the dedicated driver 54 needs to be used instead of the general-purpose driver 52 to cause the printer 10 to execute printing using the subscription service described above. Since the dedicated driver 54 is dedicated for the printer 10, it can send some notification to the printer 10 and cause the printer 10 to display this notification. For example, the dedicated driver 54 can cause the printer 10 to display a notification prompting the user to subscribe to the subscription service. On the other hand, the general-purpose driver 52 cannot send a notification for display to the printer 10.

The mobile device 60 is a portable terminal device such as a cell phone (e.g., smart phone), PDA, laptop PC, tablet PC, etc. The mobile device 60 includes a camera 62. In the present embodiment, the camera 62 is used to read a QR Code to be describes later. "QR Code" is a registered trademark of DENSO WAVE INC.

Figure 2:
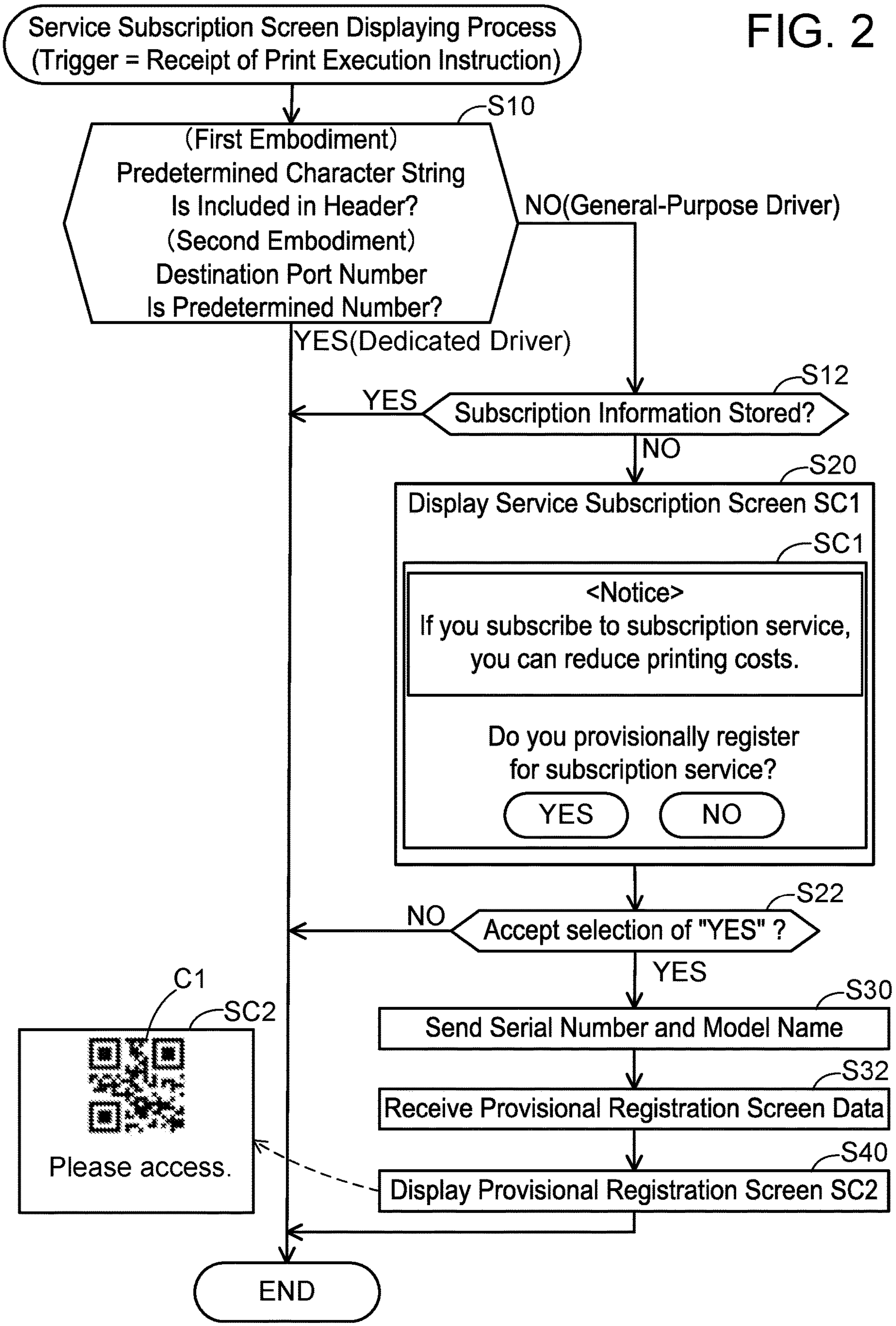
FIG. 2 illustrates a flowchart of a service subscription screen displaying process.

(Service Subscription Screen Displaying Process; FIG. 2)

Referring to FIG. 2, a service subscription screen displaying process executed by the CPU 32 of the printer 10 will be described. Start of the process of FIG. 2 is triggered by receipt of a print execution instruction including print data from the terminal device 50.

At S10, the CPU 32 determines whether a header part of the print execution instruction includes a predetermined character string (e.g., "V1"). Here, the character string "V1" is information for identifying the vendor of the printer 10 and is stored in advance in the memory 34 of the printer 10. Therefore, the fact that the header part includes the predetermined character string means that the print execution instruction is generated by the dedicated driver 54. When the header part does not include the predetermined character string, it means that the print execution instruction is generated by the general-purpose driver 52. The CPU 32 can appropriately determine whether the print execution instruction is generated by the dedicated driver 54 or the general-purpose driver 52 based on the character string included in the header part.

The CPU 32 determines YES at S10 and ends the process of FIG. 2 when the header part includes the predetermined character string, that is, when the print execution instruction is generated by the dedicated driver 54. The CPU 32 determines NO at S10 and proceeds to S12 when the header part does not include the predetermined character string, that is, when the print execution instruction is generated by the general-purpose driver 52.

At S12, the CPU 32 determines whether subscription information is stored in the memory 34. The subscription information is information indicating that the user of the printer 10 has already subscribed to the subscription service described above. When the subscription information is stored in the memory 34, the CPU 32 determines YES at S12 and ends the process of FIG. 2. In this way, it is possible to suppress the user who has already subscribed to the subscription service from feeling that receiving a service subscription e-mail to be described below is bothersome. The CPU 32 determines NO at S12 and proceeds to S20 when the subscription information is not stored in the memory 34.

At S20, the CPU 32 displays the service subscription screen SC1 on the display unit 14. The service subscription screen SC1 includes a message prompting the user to subscribe to the subscription service. The service subscription screen SC1 further includes a message inquiring whether to execute provisional registration for subscription to the subscription service, a yes button, and a no button.

At S22, the CPU 32 determines whether the yes button is selected by the user. When the CPU 32 determines that the yes button is selected by the user (YES at S22), the CPU 32 proceeds to S30. On the other hand, when the CPU 32 determines that the no button is selected by the user (NO in S22), the CPU 32 ends the process of FIG. 2.

At S30, the CPU 32 sends the serial number SN1 and the model name MN1 to the server 100. Consequently, the information necessary to subscribe to the subscription service is stored (i.e., provisionally registered) in the server 100. In particular, the server 100 generates a PIN code and stores the serial number SN1 and model name MN1 in association with the PIN code.

Next, at S32, the CPU 32 receives from the server 100 provisional registration screen data representing a provisional registration screen SC2.

At S40, the CPU 32 displays the provisional registration screen SC2 on the display unit 14. The provisional registration screen SC2 includes a QR Code C1 obtained by encoding a URL of a website for subscribing to the subscription service. The URL includes the PIN code described above. When S40 ends, the CPU 32 ends the process of FIG. 2.

Figure 3:
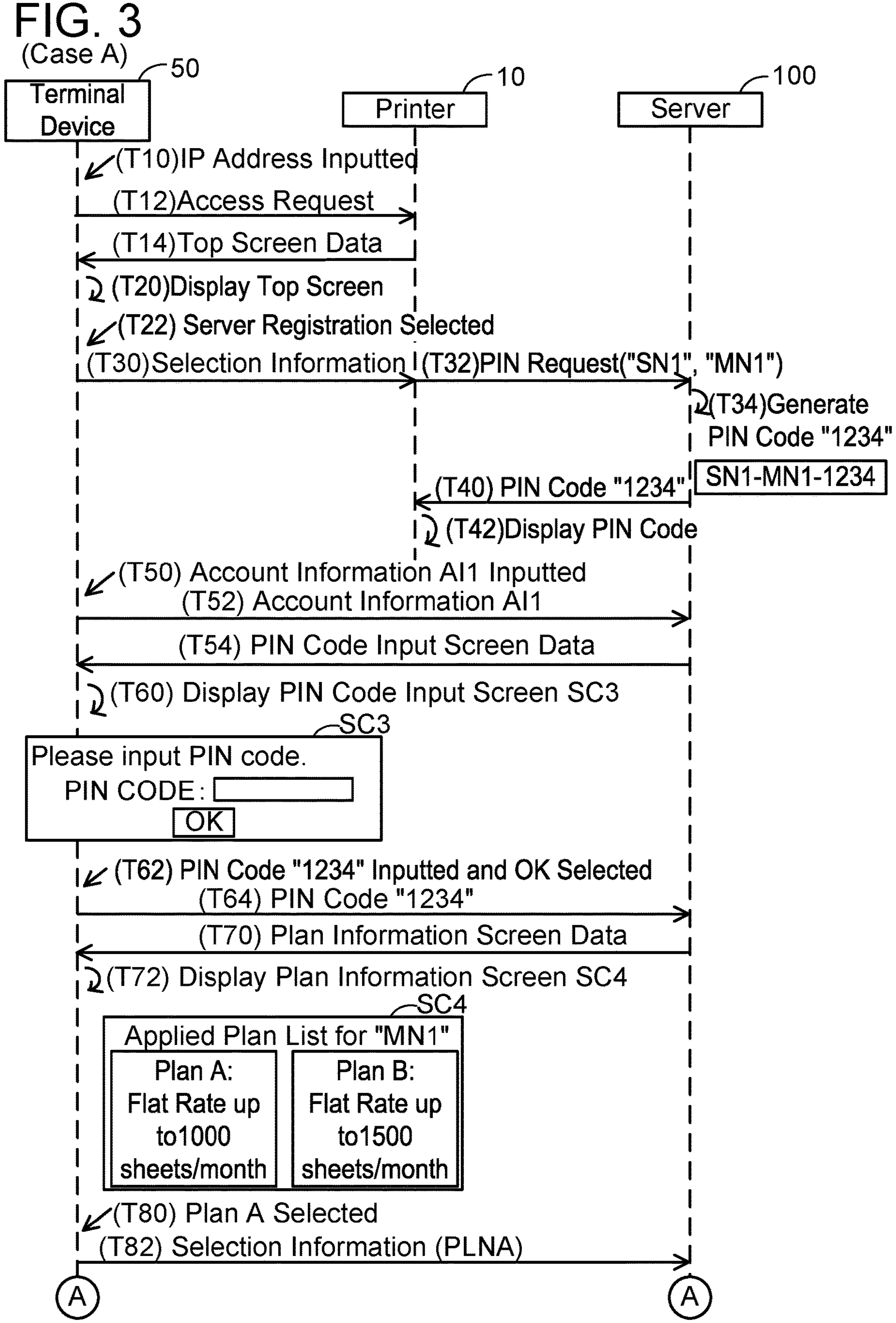
FIG. 3 illustrates a sequence diagram of Case A.
Figure 4:
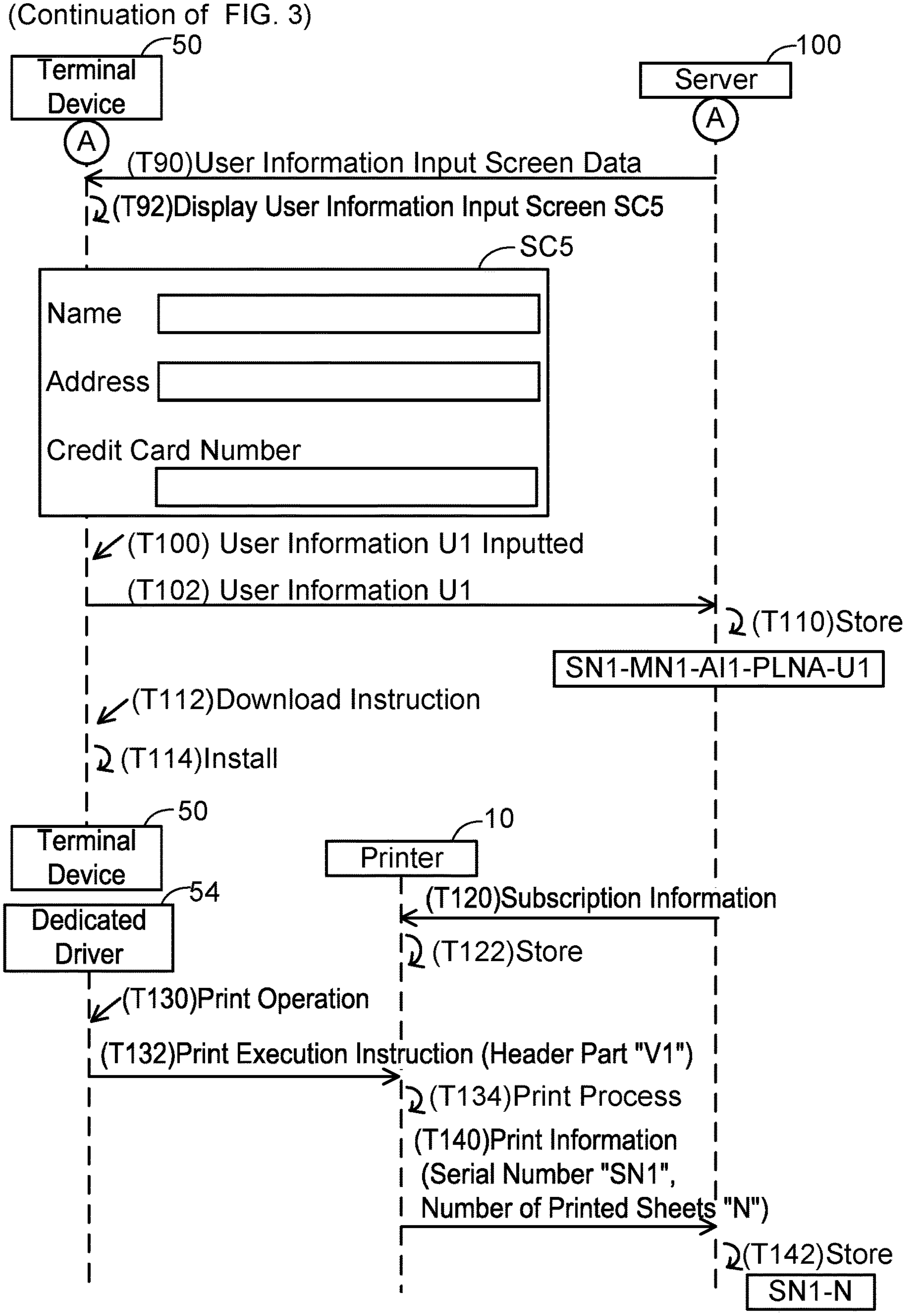
FIG. 4 illustrates a sequence diagram continued from FIG. 3.

(Process for Subscribing to Subscription Service; FIGS. 3 and 4)

Next, a process executed by each device when the user of the printer 10 subscribes to the subscription service will be described. In the initial state illustrated in FIG. 3, the terminal device 50 has accessed the server 100 by using a web browser program (not illustrated), and has displayed the service subscription screen to subscribe to the subscription service received from the server 100. The service subscription screen includes an input field for entering the IP address of the printer used for the subscription service. In the following, instead of describing contents of processes with the CPUs of the devices as subjects of actions, the contents of the processes will be described with the devices themselves or the drivers as subjects of the actions. In the terminal device 50, software controls hardware such as the CPU via an OS. The fact that the software controls the hardware via the OS is suitably omitted in the explanation in the present disclosure.

At T10, the terminal device 50 accepts input of the IP address of the printer 10 from the user. In this case, the terminal device 50 sends an access request to the printer 10 by using a web browser program at T12. The access request is information to access the web server function of the printer 10. Each of the following processes executed by the terminal device 50 is also executed by the web browser program, unless there is an explanation that another program is used.

When the printer 10 receives the access request from the terminal device 50 at T12, the printer 10 sends top screen data representing a top screen to the terminal device 50 at T14.

When the terminal device 50 receives the top screen data from the printer 10 at T14, the terminal device 50 displays the top screen at T20. The top screen includes various information (e.g., status) related to the printer 10, buttons for various settings, and a button for registration with the server 100. The terminal device 50 accepts selection of the button for registration with the server 100 at T22. In this case, at T30, the terminal device 50 sends selection information to the printer 10 indicating that the button for registration with the server 100 has been selected.

When the printer 10 receives the selection information from the terminal device 50 at T30, the printer 10 sends a PIN request including the serial number SN1 and the model name MN1 to the server 100 at T32.

When the server 100 receives the PIN request from the printer 10 at T32, the server 100 generates a PIN code "1234" and stores the serial number SN1 and the model name MN1 included in the PIN request in the memory 134 in association with the generated PIN code "1234" at T34. The server 100 then sends the PIN code "1234" to the printer 10 at T40. When the printer 10 receives the PIN code "1234" from the server 100 at T40, the printer 10 displays the PIN code "1234" at T42. This allows the user to know the PIN code "1234". Although not illustrated, a so-called always-on connection is established between the printer 10 and the server 100. By using the always-on connection, the server 100 can send a signal to the printer 10 across the firewall of the LAN6 to which the printer 10 belongs, even without receiving a request from the printer 10. In other words, the always-on connection is a connection that can execute server-push communication. The always-on connection is, for example, a connection in accordance with extensible Messaging and Presence Protocol (XMPP).

At T50, the terminal device 50 accepts input of account information AI1 from the user. The account information AI1 is information required to login to the server 100 and includes a user ID and a password. After receiving the input of the account information AI1 at T50, the terminal device 50 sends the account information AI1 to the server 100 at T52.

When the server 100 receives the account information AI1 from the terminal device 50 at T52, the server 100 sends PIN code input screen data representing a PIN code input screen SC3 to the terminal device 50 at T54.

When the terminal device 50 receives the PIN code input screen data from the server 100 at T54, the terminal device 50 displays the PIN code input screen SC3 at T60. The PIN code input screen SC3 includes a message prompting the user to input a PIN code, a PIN code input field, and an OK button.

At T62, the terminal device 50 accepts input of the PIN code "1234" into the PIN code input field and selection of the OK button from the user. In this case, the terminal device 50 sends the PIN code "1234" to the server 100 at T64.

When the server 100 receives the PIN code "1234" from the terminal device 50 at T64, the server 100 identifies one or more contracted plans for the printer having the model name MN1 associated with the PIN code "1234". Next, at T70, the server 100 sends to the terminal device 50 plan information screen data representing the plan information screen SC4 including the one or more service plans that have already been identified.

When the terminal device 50 receives the plan information screen data from the server 100 at T70, the terminal device 50 displays plan information screen SC4 at T72. The plan information screen SC4 includes the contents of Plan A and Plan B. In this case, the terminal device 50 receives selection of Plan A from the user at T80. In this case, the terminal device 50 sends the selection information including the plan information PLNA indicating the selected plan A to the server 100 at T82.

(Continuation of FIG. 3; FIG. 4)

When the server 100 receives the selected plan information from the terminal device 50 at T82, the server 100 sends user information input screen data representing a user information input screen SC5 to the terminal device 50 at T90.

When the terminal device 50 receives the user information input screen data from the server 100 at T90, the terminal device 50 displays the user information input screen SC5 at T92. The user information input screen SC5 includes a user name input field, an address input field, and a credit card number input field.

When the terminal device 50 receives input of the user information U1 (i.e., the user's name, address, and credit card number) from the user at T100, the terminal device 50 sends the inputted user information U1 to the server 100 at T102.

When the server 100 receives the user information U1 from the terminal device 50 at T102, the server 100 stores the account information AI1, the plan information PLNA, and the user information U1 in association with serial number SN1 and the model name MN1 at T110. Consequently, the user can subscribe to Plan A of the subscription service.

Thereafter, the terminal device 50 accesses the server 100 by using a web browser program (not illustrated), and displays a download screen for downloading the dedicated driver 54 (see FIG. 1). Further, at T112, the terminal device 50 accepts a download instruction from the user via the download screen. In this case, the terminal device 50 installs the dedicated driver 54 at T114. As a result, the terminal device 50 can cause the printer 10 to execute printing using the subscription service by using the dedicated driver 54.

At T120, the server 100 sends the subscription information to the printer 10 by using the always-on connection described above.

When the printer 10 receives the subscription information from the server 100 at T120, the printer 10 stores the subscription information in the memory 34 at T122.

When the dedicated driver 54 of the terminal device 50 receives a print operation from the user at T130, the terminal device 50 generates a print execution instruction including print data, and sends the print execution instruction to the printer 10 at T132. The header part of the print execution instruction includes the character string "V1".

When the printer 10 receives the print execution instruction at T132 (YES at S10 in FIG. 2), the printer 10 executes a print process according to the print execution instruction at T134. Next, the printer 10 sends print information to the server 100 at T140. The print information includes the serial number SN1 of the printer 10 and the number of printed sheets N.

When the server 100 receives the print information from the printer 10 at T140, the server 100 stores the number of printed sheets "N" included in the print information in the memory 134 in association with the serial number SN1 included in the print information at T142. Consequently, the server 100 can manage the number of sheets printed by the printer 10 and provide the subscription service to the user of the printer 10.

Figure 5:
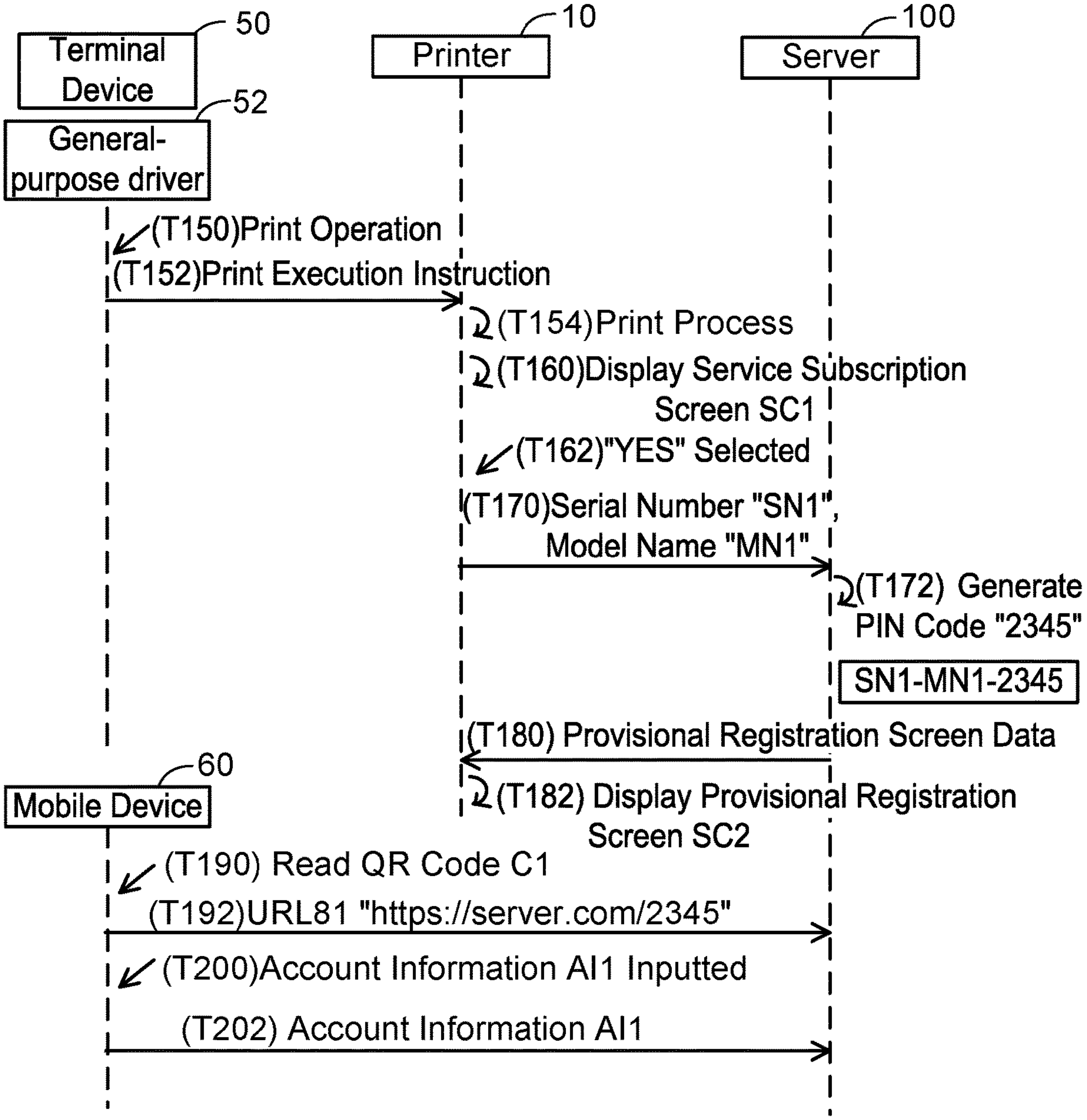
FIG. 5 illustrates a sequence diagram of Case B.

(Case B: FIG. 5)

Next, referring to FIG. 5, a case realized by the process of FIG. 2 will be described.

When the general-purpose driver 52 of the terminal device 50 receives a print operation from the user at T150, the general-purpose driver 52 generates a print execution instruction and sends the print execution instruction to the printer 10 at T152. The header part of this print execution instruction does not include the character string "V1".

When the printer 10 receives the print execution instruction at T152 (NO at S10 in FIG. 2), the printer 10 executes the print process according to the print execution instruction at T154. In the present case, the subscription information is not stored in the printer 10 (NO at S12). Therefore, the printer 10 displays the service subscription screen SC1 (see FIG. 2) at T160 (S20). When the printer 10 receives selection of the yes button from the user at T162 (YES at S22), the printer 10 sends the serial number SN1 and the model name MN1 to the server 100 at T170 (S30).

When the server 100 receives the serial number SN1 and the model name MN1 from the printer 10 at T170, the server 100 generates a PIN code "2345" and stores the serial number SN1, the model name MN1, and the PIN code "2345" in the memory 134 in association with each other at T172. In this case, at T180, the server 100 sends provisional registration screen data representing a provisional registration screen SC2 to the printer 10.

When the printer 10 receives the provisional registration screen data from the server 100 at T180 (S32), the printer 10 displays the provisional registration screen SC2 at T182 (S40).

At T190, the user uses a camera 62 of the mobile device 60 to read a QR Code C1 (see FIG. 2) included in the provisional registration screen SC2. In this case, the mobile device 60 obtains a URL 81 by decoding the QR Code C1 and sends the URL 81 to the server 100 at T192. The URL 81 includes location information of the server 100 and the PIN code "2345" generated at T172.

When the server 100 receives the URL 81 from the mobile device 60 at T192, the server 100 obtains the PIN code "2345" included in the URL 81. Consequently, the server 100 can identify the serial number SN1 and the model name MN1 (see T172) associated with the PIN code "2345".

The mobile device 60 accepts input of the account information AI1 from the user at T200. In this case, the mobile device 60 sends the account information AI1 to the server 100 at T202. The subsequent processes are the same as those of T70 to T82 in FIGS. 3 and T90 to T142 in FIG. 4. Consequently, the user can subscribe to Plan A of the subscription service.

Effects of Embodiment

The printer 10 displays the service subscription screen SC1 (S20) in the case where the print execution instruction is generated by the general-purpose driver 52 (NO at S10 in FIG. 2). Consequently, the printer 10 can properly notify the user who use the general-purpose driver 52 to cause the printer 10 to execute printing of information related to the subscription to the subscription service. Furthermore, the service subscription screen SC1 includes a message prompting the user to subscribe to the subscription service. Therefore, the printer 10 can suitably prompt the user to subscribe to the subscription service. In other words, the printer 10 can properly execute an offering for the service.

Although not illustrated in the flowchart or the sequence, in the case where the print execution instruction is generated by the dedicated driver 54 and the user has not yet subscribed to the subscription service, the printer 10 sends, to the dedicated driver 54, a notification prompting the user to subscribe to the service upon completion of the print process. Consequently, the printer 10 can execute the offering for the service. Therefore, the printer 10 does not display the service subscription screen SC1 when the print execution instruction is generated by the dedicated driver 54 (YES at S10). This is because the user may find display of the service subscription screen SC1 bothersome, since the user can receive the offering via the dedicated driver 54.

When the service subscription screen SC1 is displayed (S20) and the yes button included in the service subscription screen SC1 is selected (YES at S22), the printer 10 sends the serial number SN1 and model name MN1, which are necessary information to subscribe to the subscription service, to the server 100 (S30). Thus, the user can register the serial number SN1 and the model name MN1 with the server 100 more easily as compared to the case of FIG. 3 where the IP address needs to be inputted (see T10 in FIG. 3).

(Corresponding Relationship)

The display unit 14 is an example of an "output device". The message prompting the user to subscribe to the subscription service is an example of "service information". The service subscription screen SC1 is an example of a "predetermined screen". The subscription service is an example of a "service related to the printer". The serial number SN1 is an example of "unique identification information".

T154 in FIG. 5 is an example of "in a case where a print execution instruction is received from a terminal device, cause the print execution device to execute printing of an image according to the print execution instruction". S20 is an example of "cause an output device of the printer to output service information related to a subscription to a service related to the printer". S10 is an example of "determine whether the print execution instruction is generated by the general-purpose driver or the dedicated driver". S30 is an example of "send, to a server, printer related information related to the printer and needed for the subscription to the service".

Second Embodiment

Next, a printer 10 of the second embodiment will be described. The printer 10 of the present embodiment is the same as the printer 10 of the first embodiment, except that the process of S10 in FIG. 2 is different.

At S10 in FIG. 2, the CPU 32 determines whether a destination port number to which the print execution instruction is sent is a predetermined number other than "631". Here, the port number "631" is a port number used for communication according to the IPP scheme described above. Therefore, the fact that the port number is "631" means that the print execution instruction is generated by the general-purpose driver 52. The fact that the port number is a predetermined number other than "631" (i.e., a port number used for communication according to a protocol different from the IPP) means that the print execution instruction is generated by the dedicated driver 54. The CPU 32 can suitably determine whether the print execution instruction is generated by the dedicated driver 54 or the general-purpose driver 52 based on the destination port number to which the print execution instruction is sent (i.e., protocol).

When the destination port number is a predetermined number other than "631," that is, when the print execution instruction is generated by the dedicated driver 54, the CPU 32 determines YES at S10 and ends the process of FIG. 2. On the other hand, the CPU 32 determines NO at S10 and proceeds to S12 when the destination port number is "631", i.e., the print execution instruction is generated by the general-purpose driver 52.

Third Embodiment

Next, a printer 10 of the third embodiment will be described. The printer 10 of the present embodiment executes a service subscription image printing process illustrated in FIG. 6 instead of the service subscription screen displaying process illustrated in FIG. 2.

Figure 6:
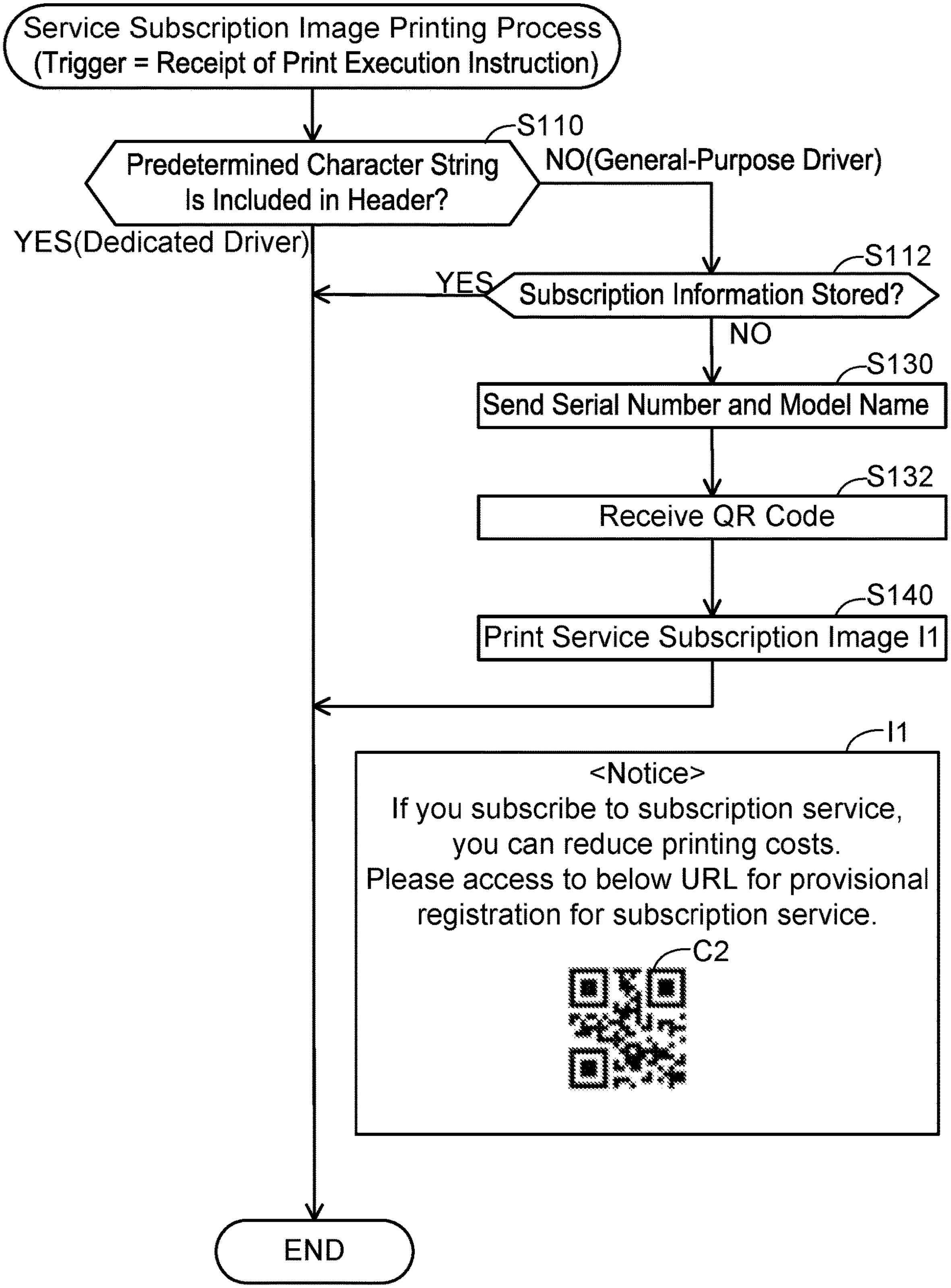
FIG. 6 illustrates a flowchart of a service subscription image printing process.

(Service Subscription Image Printing Process; FIG. 6)

With reference to FIG. 6, the service subscription image printing process executed by the CPU 32 of the printer 10 will be described. As with the process in FIG. 2, start of the process in FIG. 6 is triggered by receipt of a print execution instruction including print data from the terminal device 50.

A process of S110 is the same as that of S10 in FIG. 2, and a process of S112 is the same as that of S12. A process of S130 is the same as that of S30.

At S132, the CPU 32 receives a QR Code C2 from the server 100. As with the first embodiment, the QR Code C2 is obtained by encoding a URL of a website for subscribing to the subscription service.

At S140, the CPU 32 causes the print execution device 18 to execute printing of a service subscription image I1 including the QR Code C2 received at S132. The service subscription image I1 further includes a message prompting the user to subscribe to the subscription service. When S140 ends, the CPU 32 ends the process of FIG. 6.

Figure 7:
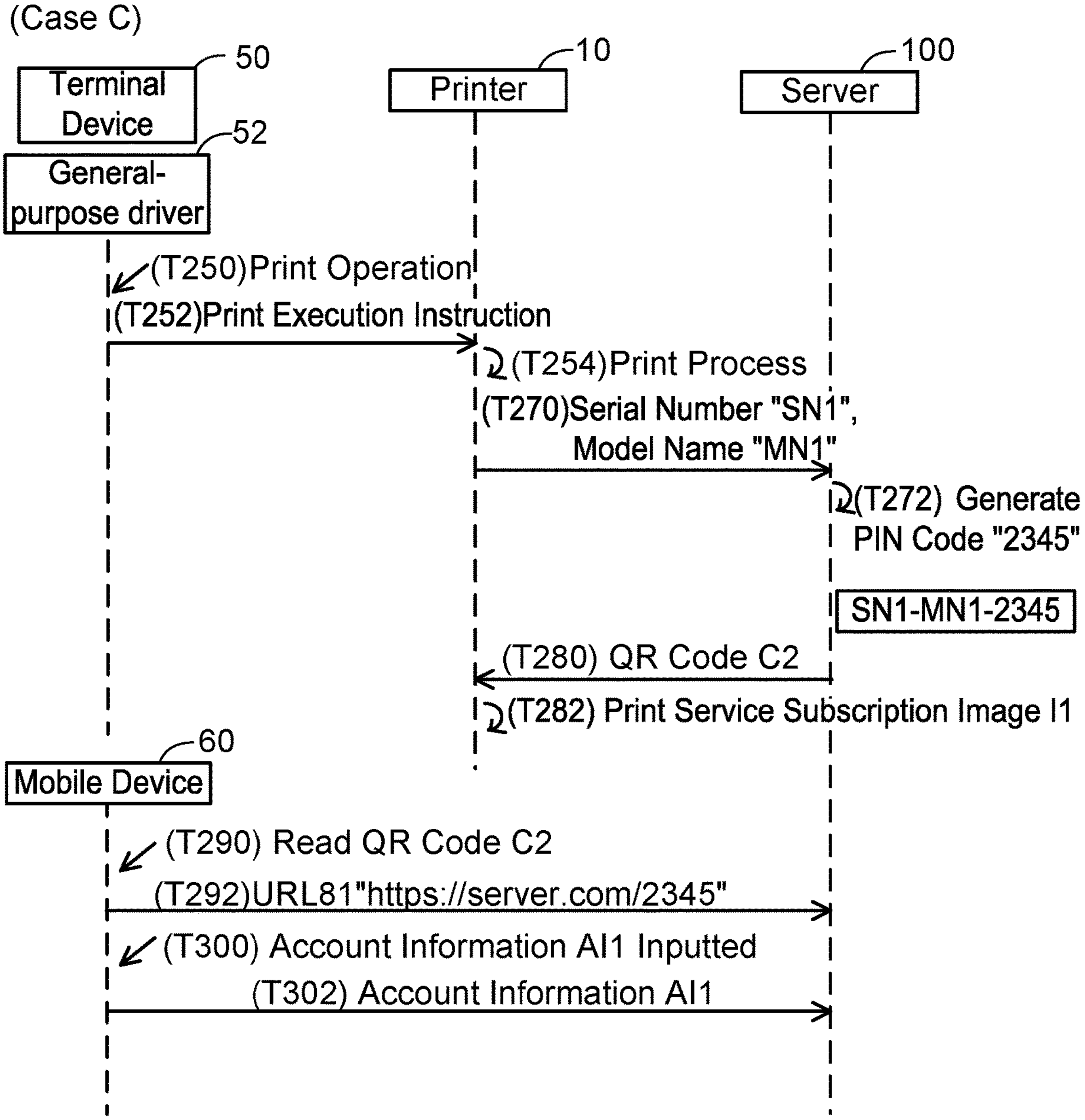
FIG. 7 illustrates a sequence diagram of Case C.

(Case C: FIG. 7)

Next, referring to FIG. 7, a case realized by the process of FIG. 6 will be described.

The initial state in FIG. 7 is the same as the initial state in FIG. 5. The processes of T250 to T254 in FIG. 7 are the same as those of T150 to T154 in FIG. 5, respectively. Further, the processes of T270 to T272 are the same as T170 to T172 in FIG. 5, respectively.

When the server 100 generates the PIN code "2345" at T272, the server 100 generates the QR Code C2 (see FIG. 6) by using the generated PIN code "2345" and the URL of the website to subscribe to the subscription service, and sends the generated QR Code C2 to the printer 10 at T280.

When the printer 10 receives the QR Code C2 from the server 100 at T280 (S132), the printer 10 causes the print execution device 18 to execute printing of the service subscription image I1 (see FIG. 6) including the QR Code C2 at T282 (S140).

Processes of T290 to T302 in FIG. 7 are the same as those of T190 to T202 in FIG. 5, respectively.

Effects of Embodiment

When the print execution instruction is generated by the general-purpose driver 52 (NO at S110 in FIG. 6), the printer 10 prints the service subscription image I1 (S140). Consequently, the printer 10 can properly notify the user, who uses the general-purpose driver 52 to cause the printer 10 to execute printing, of information related to the subscription to the subscription service. In the present embodiment, the print execution device 18 is an example of "output device". The message prompting the user to subscribe to the subscription service and the QR Code C2 are examples of "service information", and the service subscription image I1 is an example of "predetermined image".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) The user may subscribe to the subscription service by using the mobile device 60. In this case, the printer 10 may display on the display unit 14 a QR Code obtained by encoding a character string including the printer 10's own IP address and a URL for accessing the web server function of the printer 10. In this modification, the user can display the top screen (see T20 in FIG. 3) on the mobile device 60 without using the camera 62 of the mobile device 60 to enter the IP address by reading this QR Code.

(Modification 2) The always-on connection may not be established between the printer 10 and the server 100. In this case, the printer 10 may send a predetermined query signal to the server 100 when the printer 10 receives a predetermined operation from the user. The server 100 may send the subscription information to the printer 10 in response to receiving the query signal.

(Modification 3) The "service" is not limited to the service in the embodiments above. For example, the "service" may be a service to automatically ship color material cartridge(s) that can be installed in the printer 10, or a service to provide special image processing on printed image(s).

(Modification 4) The CPU 32 may not execute the process of S12 in FIG. 2. In general terms, the CPU 32 may be configured to display a predetermined screen on the display unit when the print execution instruction is received from the terminal device and the print execution instruction is generated by the general-purpose driver, regardless of whether the subscription information is stored in the memory.

(Modification 5) The service subscription screen SC1 may not include the query message for a provisional registration, the yes button or the no buttons. In this case, S22 to S40 in FIG. 2 are not executed. In this modification, "send, to a server, printer related information related to the printer and needed for subscription to the service" may be omitted. In another modification, at S40, the CPU 32 may display the provisional registration screen on the display unit 14 by using provisional registration screen data stored in the memory 34 in advance, without executing S22 to S32 in FIG. 2.

(Modification 6) The CPU 32 may send only one of the serial number SN1 and the model name MN1 to server 100 at S30 of FIG. 2. The CPU 32 may send user information (e.g., name, address, etc.) that is pre-registered with the printer 10 to the server 100, for example, without sending either the serial number SN1 or the model name MN1 to the server 100. In the present modification, the user information is an example of "printer related information".

(Modification 7) The printer 10 of the third embodiment may display a setting screen on the display unit 14 and accept selection from the user whether printing of the service subscription image I1 should be executed when the print execution instruction is received. The printer 10 may store the selection result in the setting screen in the memory 34, and after S112 in FIG. 6, determine whether the selection result in the memory 34 indicates that printing of the service subscription image I1 should be executed. The CPU 32 may proceed to S130 when the selection result indicates that printing of the service subscription image I1 should be executed, while when the selection result indicates that printing of the service subscription image I1 should not be executed, the CPU 32 may end the process in FIG. 6. Consequently, the printer 10 can switch between executing and not executing the printing of the service subscription image I1, depending on the user's intention.

(Modification 8) The CPU 32 may not execute the processes of S130 or S132 in FIG. 6. In this modification, "send, to a server, printer related information related to the printer and needed for subscription to the service" may be omitted. In this case, at S140, the CPU 32 may cause the print execution device 18 to execute printing of the service subscription screen including the QR Code stored in the memory 34 in advance.

(Modification 9) The service subscription image I1 in FIG. 6 may include only one of the message that prompts the user to subscribe to the subscription service and the QR Code C2.

(Modification 10) In the above embodiments, the processes of FIGS. 2 to 7 are implemented by the CPU 32 executing the program 36. Instead of this, any of the processes of FIGS. 2 to 7 may be implemented by hardware such as a logic circuit.

(Modification 11) In the above embodiments, an example in which the CPU 32 of the printer 10 does not display the service subscription screen SC1 on the display unit 14 when the print execution instruction is generated by the dedicated driver 54 was described, however, the CPU 32 of the printer 10 may display the service subscription screen SC1 on the display unit 14 even when the print execution instruction is generated by the dedicated driver 54. When offering is not performed via the dedicated driver 54, the CPU 32 of the printer 10 displays the service subscription screen SC1 on the display unit 14, by which the service can properly be offered to the user. Further, even when the offering is performed via the dedicated driver 54, the user may still want the offering of the service on the display unit 14.

(Modification 12) In the above embodiment, an example in which the printer 10 does not print the service subscription image I1 when the print execution instruction is generated by the dedicated driver 54 was described, however, the printer 10 may print the service subscription image I1 even when the print execution instruction is generated by the dedicated driver 54. When offering is not performed via the dedicated driver 54, the printer 10 prints the service subscription screen SC1, by which the service can properly be offered to the user. Further, even when the offering is performed via the dedicated driver 54, the user may still want the offering of the service through printing of the service subscription screen SC1.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A printer comprising:
a print execution device; and
a controller,
wherein the controller is configured to:
in a case where a print execution instruction is received from a terminal device, cause the print execution device to execute printing of an image according to the print execution instruction;
determine whether the print execution instruction has been generated by a general-purpose driver not provided by a vendor of the printer; and
based on a result of the determination that the print execution instruction has been generated by the general-purpose driver, cause the print execution device to print service information related to a subscription to a service related to the printer or cause a display of the printer to display the service information.

2. The printer as in claim 1, further comprising:
a memory configured to store subscription information indicating that a user of the printer has already subscribed to the service,
wherein the controller is configured to:
cause the print execution device to print the service information or cause the display to display the service information, in a case where the print execution instruction is received from the terminal device, the print execution instruction is generated by the general-purpose driver, and the subscription information is not stored in the memory; and
the service information is not printed or displayed in a case where the print execution instruction is received from the terminal device, the print execution instruction is generated by the general-purpose driver, and the subscription information is stored in the memory.

3. The printer as in claim 1, wherein
in a case where the print execution instruction is received from the terminal device and the print execution instruction is generated by a dedicated driver provided by the vendor of the printer, the service information is not printed or displayed.

4. The printer as in claim 3, wherein
the controller is further configured to:
in the case where the print execution instruction is received from the terminal device, determine whether the print execution instruction is generated by the general-purpose driver or the dedicated driver;
in a case where the print execution instruction does not include a predetermined character string corresponding to the vendor, determine that the print execution instruction is generated by the general-purpose driver; and
in a case where the print execution instruction includes the predetermined character string, determine that the print execution instruction is generated by the dedicated driver.

5. The printer as in claim 3, wherein
the controller is further configured to:
in the case where the print execution instruction is received from the terminal device, determine whether the print execution instruction is generated by the general-purpose driver or the dedicated driver;

in a case where the print execution instruction is an instruction according to a first protocol, determine that the print execution instruction is generated by the general-purpose driver; and in a case where the print execution instruction is an instruction according to a second protocol being different from the first protocol, determine that the print execution instruction is generated by the dedicated driver.

6. The printer as in claim 2, wherein the controller is configured to:

in a case where the print execution instruction is received from the terminal device and the print execution instruction is generated by the general-purpose driver, cause the print execution device to print a predetermined image including the service information; and in a case where the print execution instruction is received from the terminal device and the print execution instruction is generated by the dedicated driver, the predetermined image is not printed.

7. The printer as in claim 1, wherein the controller is further configured to:

in a case where the service information is printed or displayed, send, to a server, printer related information related to the printer and needed for the subscription to the service.

8. The printer as in claim 7, wherein the printer related information includes unique identification information for identifying the printer.

9. The printer as in claim 7, wherein the printer related information includes a model name of the printer.

10. The printer as in claim 2, wherein the controller is configured to:

in a case where the print execution instruction is received from the terminal device and the print execution instruction is generated by the general-purpose driver, cause the display to display a predetermined screen including the service information; and in a case where the print execution instruction is received from the terminal device and the print execution instruction is generated by the dedicated driver, the predetermined screen is not displayed.

11. A non-transitory computer-readable recording medium storing computer-readable instructions for a printer, wherein the computer-readable instructions, when executed by a processor of the printer, cause the printer to:

in a case where a print execution instruction is received from a terminal device, cause a print execution device of the printer to execute printing of an image according to the print execution instruction; and determine whether the print execution instruction has been generated by a general-purpose driver not provided by a vendor of the printer; and based on a result of the determination that the print execution instruction has been generated by the general-purpose driver, cause the print execution device to print service information related to a subscription to a service related to the printer or cause a display of the printer to display the service information.

12. A method executed by a printer with a controller, the method comprising:

in a case where a print execution instruction is received from a terminal device, causing a print execution device of the printer to execute printing of an image according to the print execution instruction; and determining, by the controller, whether the print execution instruction has been generated by a general-purpose driver not provided by a vendor of the printer; and based on a result of the determination that the print execution instruction has been generated by the general-purpose driver, causing, by the controller, the print execution device to print service information related to a subscription to a service related to the printer or causing a display of the printer to display the service information.

* * * * *